D. R. LOVEJOY.
APPARATUS FOR EFFECTING CHEMICAL ACTION IN GASES.
APPLICATION FILED FEB. 18, 1903. RENEWED MAR. 23, 1908.
904,073.
Patented Nov. 17, 1908.
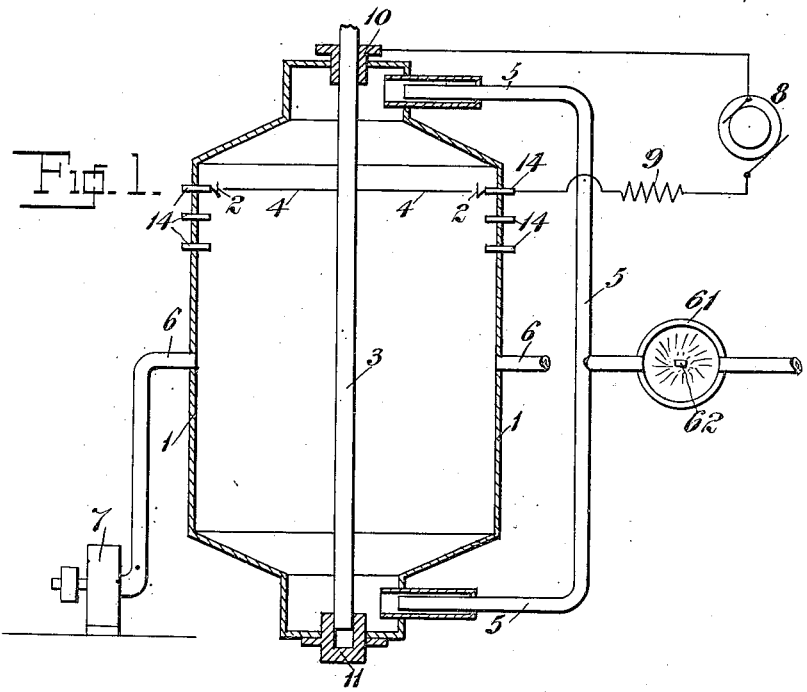
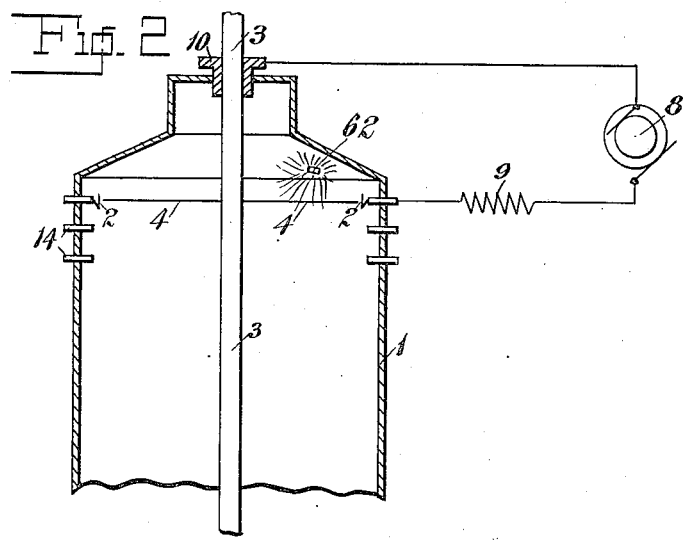

UNITED STATES PATENT OFFICE.

DIMMITT R. LOVEJOY, OF NIAGARA FALLS, NEW YORK, ASSIGNOR, BY MESNE ASSIGNMENTS, TO WALTER E. F. BRADLEY, TRUSTEE, OF NEW YORK, N. Y.

APPARATUS FOR EFFECTING CHEMICAL ACTION IN GASES.

No. 904,073.            Specification of Letters Patent.            Patented Nov. 17, 1908.

Application filed February 18, 1903, Serial No. 143,973. Renewed March 23, 1908. Serial No. 422,734.

*To all whom it may concern:*

Be it known that I, DIMMITT R. LOVEJOY, a citizen of the United States, residing at Niagara Falls, in the county of Niagara and State of New York, have invented certain new and useful Improvements in Apparatus for Effecting Chemical Action in Gases, of which the following is a specification.

This invention relates to improvements in apparatus for effecting the union or chemical action of gases by the agency of electric arcs formed within or in connection with a chamber in which are contained the mixed gases to be chemically combined. The application of C. S. Bradley and D. R. Lovejoy, No. 8,008 filed March 9, 1900, and my application No. 109,443 filed May 29, 1902, described apparatus for this purpose in which cases a series of electrodes is moved past another series of electrodes oppositely charged to a high tension, so as to successively form, elongate, and break arcs between such electrodes, within a chamber in which the mixed gases to be united are confined.

I have discovered that the desired effect may be more successfully produced by subjecting the gases to radiant energy from radium, uranium, helium, or other source of such energy, either preliminary to, or during the time of action of the electric arcs on such mixed gases. Inasmuch as my present improvement relates to the conjoint agency of such radiant energy and of the electric arcs, the invention is one and the same in principle, whether the mixed gases be subjected to such radiant energy preliminarily to their admission to the chamber where the electric arcs are formed; or subjected to such radiant energy within such treating chamber and simultaneously with the action of the electric arcs on said gases.

In the accompanying drawings, I have shown diagrammatically, two forms of apparatus illustrating my invention and respectively adapted for use in the two different ways referred to.

Figure 1 is a diagrammatic longitudinal section of an apparatus adapted for subjecting the mixed gases to radiant energy from a suitable source of such energy, immediately before their admission to the chamber where they are subjected to the effect of electric arcs, for instance, as described in my prior application No. 109,443, hereinbefore referred to. Fig. 2 is a similar view in which the gases are subjected to the action of such radiant energy within the chamber through which they are passed under the influence of the electric arcs, and simultaneously to their subjection to the effect of such electric arcs.

Referring to Fig. 1, 1 represents a cylinder having numerous fixed electrodes 2 projecting from its inner periphery. 3 represents a shaft mounted centrally and rotating within the cylinder 1 and carrying a number of movable electrodes 4 connected mechanically and electrically with the said shaft. 5 represents the induction pipe for admission of fresh mixed gases, (atmospheric air, for example,) and 6, 6, outlet ducts for the removal of the nitrogen compounds formed under the treatment. 7 indicates an exhaust fan to illustrate suitable means for causing the flow of gases through the chamber; 8 a suitable source of high tension electric currents, either unidirectional or alternating, and 9 a series of inductances or choke-coils each having one terminal connected individually to the fixed electrodes 2 and, in practice, having their other terminals grouped together and connected to one pole of the generator 8, the circuit being completed by connecting the shaft 3, by means of a conductor with the other pole of the generator 8. The shaft 3 is preferably mounted in insulating bearings 10 and 11 at top and bottom as described in my prior application, and the stationary electrodes 2 mounted in tubes or bushings 14 of porcelain or other insulating material set in packings, in the cylinder walls, adapted to prevent the passage of gas and also to permit the radial adjustment of the fixed electrodes 2 relatively to the electrodes 4 which revolve in proximity to such stationary electrodes. 61 represents a chamber in the induction pipe 5 containing a body 62 of radium or other suitable source of radiant energy to which the inflowing gas is subjected immediately before entering the cylinder 1.

In Fig. 2 similar reference characters indicate corresponding parts and 62ª indicates a body of radium or other source of radiant energy, to the effect of which the gas is subjected within the chamber simultaneously with the action of the electric arcs upon it.

As an example of the voltage and strength of the current which may be employed I would state that a voltage of from 5000 to 6000 volts, and a current of about 3 amperes may be employed. The invention, however, is not limited to the strength of current and voltage herein given, the most advantageous conditions in this respect being determined by those skilled in the art.

A source of Roentgen rays or means for concentrating the rays of the sun or other source of radiant energy may be used in conjunction with the electric arc in carrying my invention into effect, and are to be regarded as equivalents of substances capable of spontaneous emission of radiant energy, for the purpose of my present invention.

It will be understood that while this invention is described particularly with reference to the formation of oxids of nitrogen; it is also applicable to effecting the chemical combinations of any other gases in a similar manner.

Having thus described my invention, what I claim as new therein and desire to secure by Letters Patent is:—

1. In apparatus for subjecting gases to high tension electric discharges, the combination of means for forming electric arcs, means for passing gases to be treated in proximity to said arcs, and means for subjecting such gases to radio-active energy, substantially as described.

2. In apparatus for subjecting gases to high tension electric discharges, the combination of means for successively forming and breaking electric arcs, means for passing gases to be treated in proximity to said arcs, and means for subjecting such gases to radio-active energy.

3. In apparatus for subjecting gases to high tension electric discharges, the combination of two sets of relatively movable electrodes, means for passing gases to be treated in proximity to said arcs, and means for subjecting such gases to radio-active energy, substantially as described.

4. In apparatus for subjecting gases to high tension electric discharges, the combination of means for successively forming, elongating and breaking electric arcs; means for passing gases to be treated in close proximity to the point at which such electric arcs are produced; and means for subjecting the gases to radio-active energy at a point adjacent to that of which such electric arcs are formed, substantially as described.

5. In an apparatus of the character described, the combination of a chamber, two sets of relatively movable electrodes mounted within the chamber, means connected with said electrodes to successively form, elongate and extinguish arcs between said electrodes, means to introduce gases into said chamber, and means in the path of the gases for subjecting the same to the influence of a radio-active body.

6. In an apparatus of the character described, the combination with a mixing chamber, relatively movable electrodes within said chamber, means to form arcs between said electrodes, means to introduce gases into said chamber, and means to subject the gases within the chamber to the influence of radio-active bodies.

D. R. LOVEJOY.

Witnesses:
 CLAUDE K. MILLS,
 WM. GIRLING.